US012568490B2

(12) United States Patent
Matsumura et al.

(10) Patent No.: US 12,568,490 B2
(45) Date of Patent: Mar. 3, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 301 days.

(21) Appl. No.: 18/278,327

(22) PCT Filed: Mar. 3, 2021

(86) PCT No.: PCT/JP2021/008118
§ 371 (c)(1),
(2) Date: Aug. 22, 2023

(87) PCT Pub. No.: WO2022/185440
PCT Pub. Date: Sep. 9, 2022

(65) Prior Publication Data

US 2024/0147463 A1      May 2, 2024

(51) Int. Cl.
*H04W 72/1268* (2023.01)
*H04L 5/00* (2006.01)
*H04W 16/28* (2009.01)
*H04W 72/232* (2023.01)

(52) U.S. Cl.
CPC ....... *H04W 72/1268* (2013.01); *H04L 5/0051* (2013.01); *H04W 16/28* (2013.01); *H04W 72/232* (2023.01)

(58) Field of Classification Search
CPC ........... H04W 72/1268; H04W 72/232; H04W 16/28; H04L 5/0051; H04L 5/00; H04L 5/0023; H04L 5/0044; H04L 5/0048; H04L 5/0053; H04L 5/0094
USPC .................................................. 370/329–330
See application file for complete search history.

(56) References Cited

U.S. PATENT DOCUMENTS

| 2020/0305168 A1* | 9/2020 | Liou | ...................... H04L 5/0098 |
| 2021/0242925 A1* | 8/2021 | Bai | ...................... H04W 52/365 |
| 2021/0321379 A1* | 10/2021 | Cirik | .................. H04B 7/06968 |
| 2022/0225362 A1* | 7/2022 | Yi | ........................... H04L 1/189 |
| 2023/0262696 A1* | 8/2023 | Chen | .................... H04L 5/0023 |
| | | | 370/329 |

(Continued)

OTHER PUBLICATIONS

Office Action issued in Japanese Application No. 2023-503254, mailed Jan. 21, 2025 (5 pages).

(Continued)

*Primary Examiner* — Candal Elpenord
(74) *Attorney, Agent, or Firm* — Osha Bergman Watanabe & Burton

(57) ABSTRACT

A terminal according to one aspect of the present disclosure includes a receiving section that receives information related to configuration of transmission of a plurality of physical uplink shared channels (PUSCHs) based on one piece of downlink control information (DCI), and a control section that determines, out of a plurality of reference signal indices, one or more reference signal indices used for at least one of spatial relations and pathloss reference signals (PL-RSs) for the plurality of PUSCHs. According to one aspect of the present disclosure, it is possible to appropriately control PUSCH repetition transmission even when multiple TRPs are applied.

5 Claims, 12 Drawing Sheets

(56) References Cited

U.S. PATENT DOCUMENTS

| | | | | |
|---|---|---|---|---|
| 2023/0397204 | A1* | 12/2023 | Yuan | H04L 1/08 |
| 2023/0422180 | A1* | 12/2023 | Yuan | H04W 52/242 |
| 2024/0137087 | A1* | 4/2024 | Bhamri | H04B 7/086 |

OTHER PUBLICATIONS

Lenovo, Motorola Mobility: "Enhancements for HST-SFN deployment"; 3GPP TSG RAN WG1 #104-e, R1-2100988; e-Meeting, Jan. 25-Feb. 5, 2021 (11 pages).
International Search Report issued in PCT/JP2021/008118 on Oct. 19, 2021 (1 page).
Written Opinion of the International Searching Authority issued in PCT/JP2021/008118 on Oct. 19, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Ntt Docomo, Inc.; "Discussion on MTRP for reliability"; 3GPP TSG RAN WG1 #104-e, R1-2101598; e-Meeting; Jan. 25-Feb. 5, 2021 (15 pages).

* cited by examiner

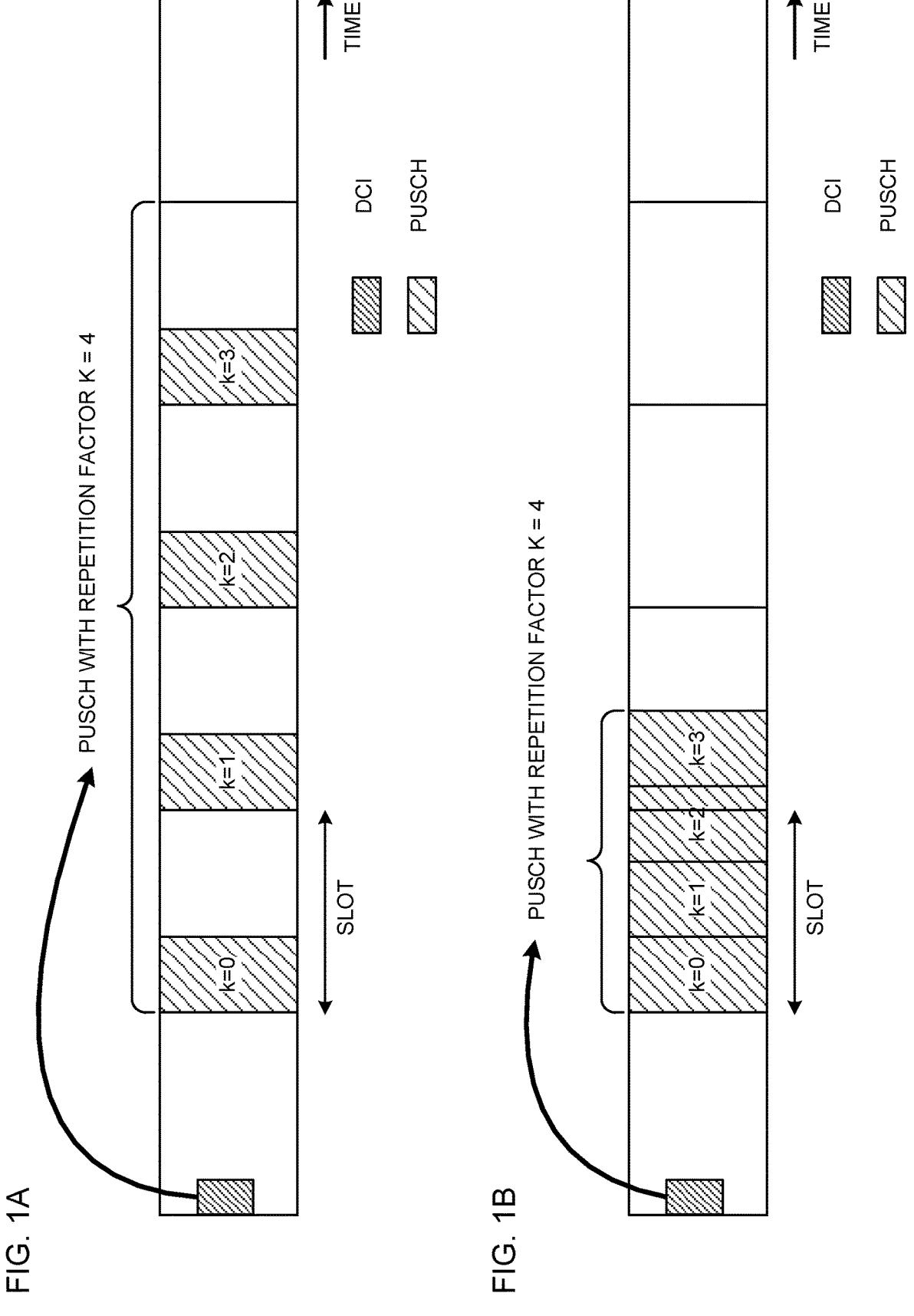

FIG. 5A

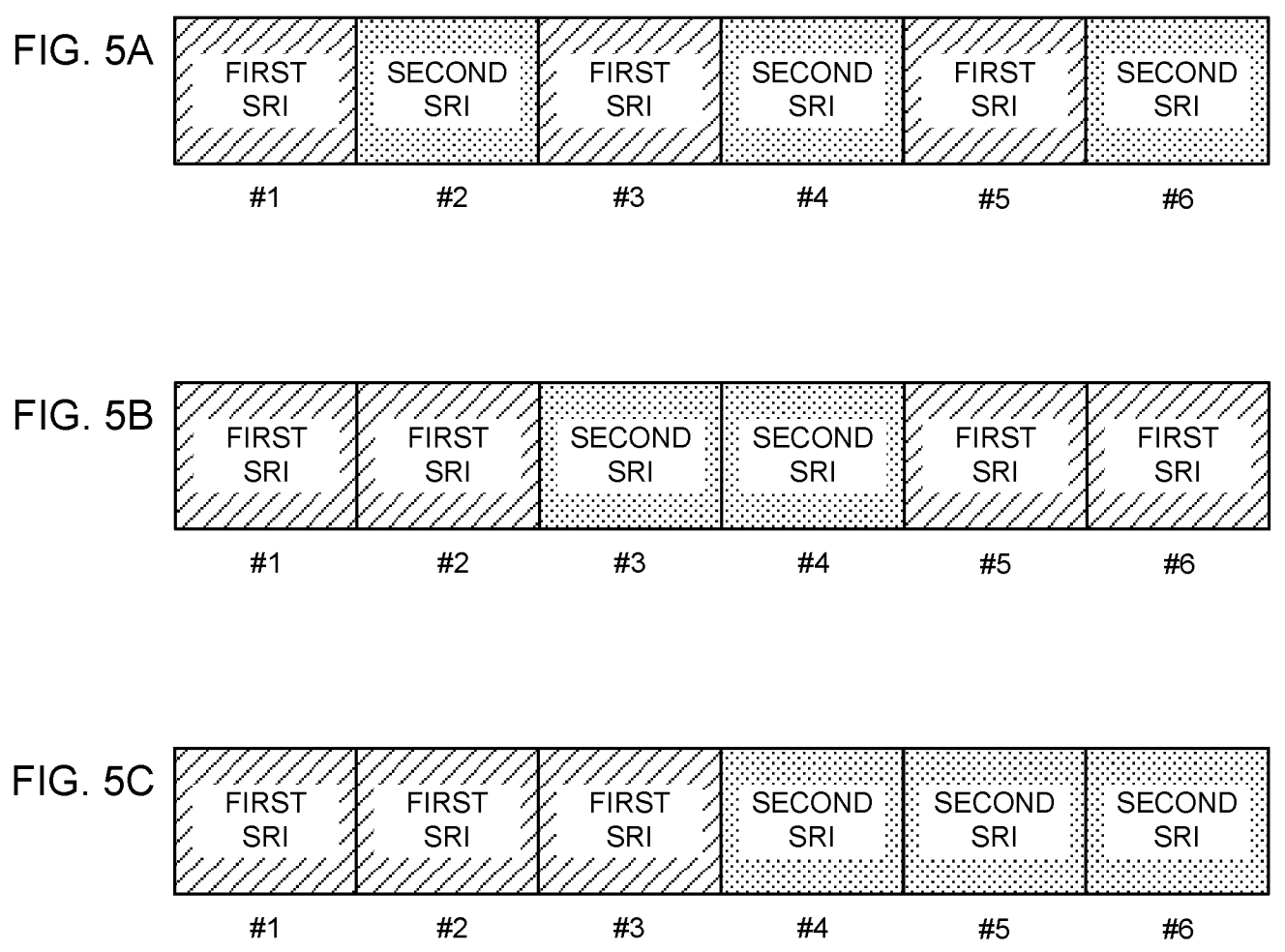

| FIRST SRI | SECOND SRI | FIRST SRI | SECOND SRI | FIRST SRI | SECOND SRI |
|---|---|---|---|---|---|
| #1 | #2 | #3 | #4 | #5 | #6 |

FIG. 5B

| FIRST SRI | FIRST SRI | SECOND SRI | SECOND SRI | FIRST SRI | FIRST SRI |
|---|---|---|---|---|---|
| #1 | #2 | #3 | #4 | #5 | #6 |

FIG. 5C

| FIRST SRI | FIRST SRI | FIRST SRI | SECOND SRI | SECOND SRI | SECOND SRI |
|---|---|---|---|---|---|
| #1 | #2 | #3 | #4 | #5 | #6 |

| DCI codepoint | SRI#1 |
|---|---|
| 0 | RS resource#1 |
| 1 | RS resource#2 |

| DCI codepoint | SRI#2 |
|---|---|
| 0 | RS resource#3 |
| 1 | RS resource#4 |

FIG. 7A

DCI

Beam/PL-RS#1

PUSCH#1

Beam/PL-RS#1

PUSCH#2 time

FIG. 7B

DCI

Beam/PL-RS#1

PUSCH#1

Beam/PL-RS#2

PUSCH#2 time

FIG. 8A

SRI#1 | SRI#2 | TPMI#1 | TPMI#2 | TPC#1 | TPC#2 ··· → DCI field

FIG. 8B

TPMI#1 | TPMI#2 | TPC#1 | TPC#2 ··· → DCI field

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For 3GPP Rel. 15, repetition transmission of a UL data channel (for example, an uplink shared channel (Physical Uplink Shared Channel (PUSCH))) is supported. A UE performs control so as to transmit the PUSCH across a plurality of slots (for example, K consecutive slots) on the basis of a repetition factor K configured from a network (for example, a base station). In other words, when the repetition transmission is performed, respective PUSCHs are transmitted in different slots (for example, in units of slots).

On the other hand, for Rel. 16 (or later versions), a plurality of PUSCH transmissions performed in 1 slot when PUSCH repetition transmission is performed are under study. In other words, respective PUSCH transmissions are performed in units of anything shorter than the slots (for example, in units of sub-slots or in units of mini-slots).

For Rel. 16 (or later versions), dynamic switching between single PUSCH transmission and PUSCH repetition transmission is under study.

For NR, communication using one or a plurality of transmission/reception points (TRPs) (multi-TRP) is under study.

However, for NR specifications thus far, how to control PUSCH repetition transmission in multiple panels/TRPs has not been fully studied. Unless PUSCH repetition transmission in multi-TRP is appropriately performed, throughput reduction or communication quality degradation may occur.

Thus, an object of the present disclosure is to provide a terminal, a radio communication method, and a base station that can appropriately control PUSCH repetition transmission.

Solution to Problem

A terminal according to one aspect of the present disclosure includes a receiving section that receives information related to configuration of transmission of a plurality of physical uplink shared channels (PUSCHs) based on one piece of downlink control information (DCI), and a control section that determines, out of a plurality of reference signal indices, one or more reference signal indices used for at least one of spatial relations and pathloss reference signals (PL-RSs) for the plurality of PUSCHs.

Advantageous Effects of Invention

According to one aspect of the present disclosure, it is possible to appropriately control PUSCH repetition transmission even when multiple TRPs are applied.

BRIEF DESCRIPTION OF DRAWINGS

FIGS. 1A and 1B are each a diagram to show an example of PUSCH repetition transmission.

FIGS. 5A to 5C are each a diagram to show an example of correspondence between a plurality of SRIs and a plurality of repetition transmissions.

FIGS. 7A and 7B are diagrams to show an example of existing PUSCH repetition transmission and PUSCH repetition transmission according to a second embodiment.

FIGS. 8A and 8B are each a diagram to show an example of a DCI format to configure single DCI-based PUSCH repetition transmission.

DESCRIPTION OF EMBODIMENTS (Repetition Transmission)

Figures 2A, 2B:
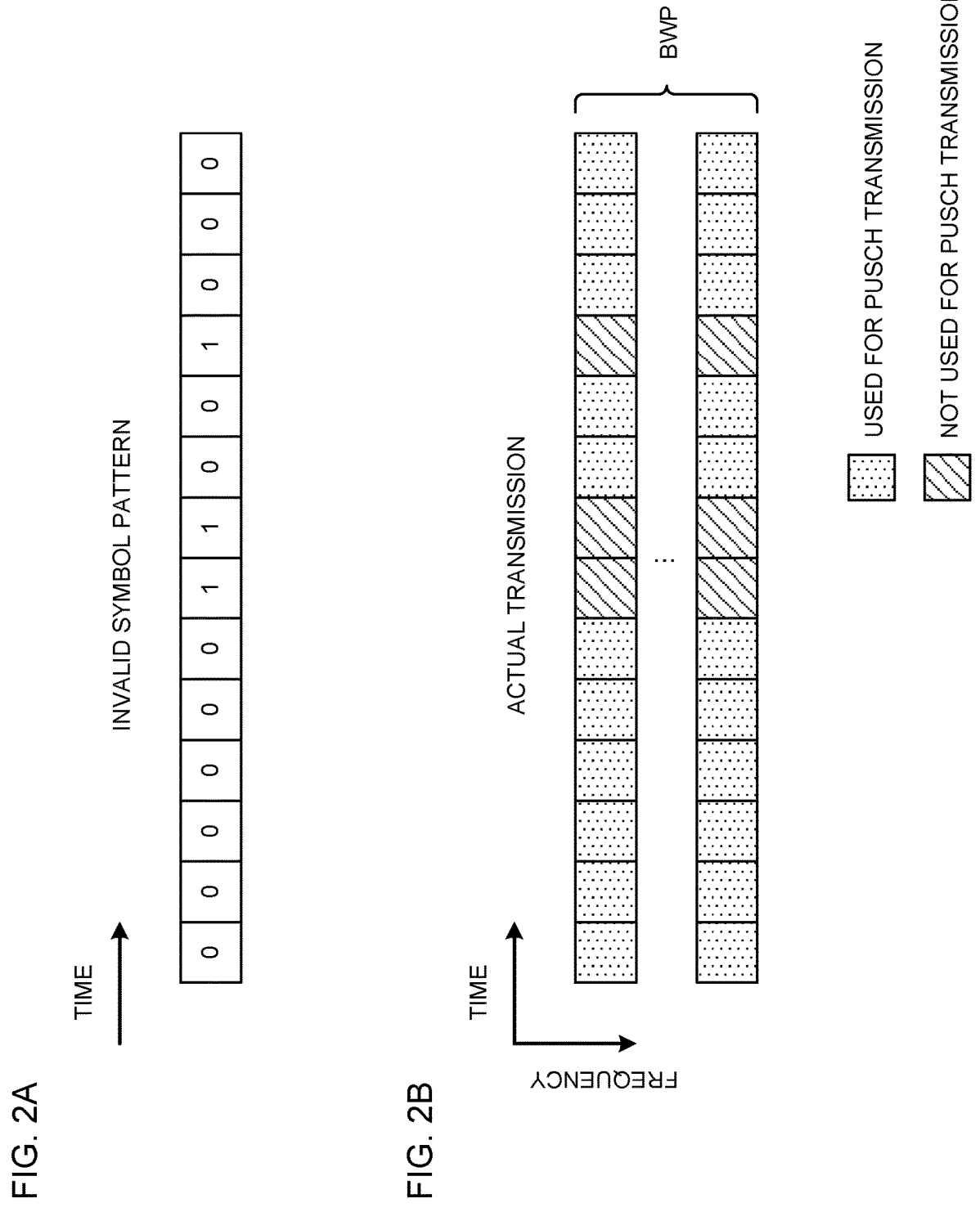
FIGS. 2A and 2B are each a diagram to show an example of an invalid symbol pattern.

For Rel. 15, repetition transmission is supported in data transmission. For example, a base station (network (NW), gNB) performs a certain number of repetition transmissions of DL data (for example, a downlink shared channel (PDSCH)). Alternatively, a UE performs a certain number of repetition transmissions of UL data (for example, an uplink shared channel (PUSCH)).

FIG. 1A is a diagram to show an example of PUSCH repetition transmission. FIG. 1A shows an example in which the PUSCH with a certain number of repetitions is scheduled by single DCI. The number of the repetitions is also referred to as a repetition factor K or an aggregation factor K.

The repetition factor K=4 in FIG. 1A, but a K value is not limited to this. The n-th repetition is also referred to as the n-th transmission occasion or the like, and may be identified by a repetition index k ($0 \leq k \leq K-1$). FIG. 1A shows repetition transmission of a PUSCH (for example, a dynamic grant-based PUSCH) dynamically scheduled by the DCI, but the repetition transmission may be applied to repetition transmission of a configured grant-based PUSCH.

For example, in FIG. 1A, the UE semi-statically receives information (for example, aggregationFactorUL or aggregationFactorDL) indicating the repetition factor K by using higher layer signaling. Here, the higher layer signaling may be, for example, any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), and the like.

The UE controls PDSCH reception processing (for example, at least one of reception, demapping, demodulation, and decoding) or PUSCH transmission processing (for example, at least one of transmission, mapping, modulation, and coding) in K consecutive slots on the basis of a field value of at least one of the following (or information indicated by the field value) in the DCI:

Allocation of time domain resources (for example, start symbols, the number of symbols in each slot, or the like)

Allocation of frequency domain resources (for example, a certain number of resource blocks (RBs) or a certain number of resource block groups (RBGs))

Modulation and coding scheme (MCS) index

Configuration of PUSCH demodulation reference signal (DMRS)

PUSCH spatial relation information (spatial relation info) or transmission configuration indication (TCI (Transmission Configuration Indication or Transmission Configuration Indicator)) state (TCI state (TCI-state))

Identical symbol allocation may be applied between the K consecutive slots. FIG. 1A shows a case where a PUSCH in each slot is allocated to a certain number of symbols from the head of the slot. The identical symbol allocation between the slots may be determined in a manner as described in the time domain resource allocation above.

For example, the UE may determine symbol allocation in each slot on the basis of a start symbol S and the number of symbols L (for example, Start and Length Indicator (SLIV)) determined on the basis of a value m of a certain field (for example, a TDRA field) in DCI. Note that the UE may determine the first slot on the basis of K2 information determined on the basis of the value m of the certain field (for example, the TDRA field) of the DCI.

On the other hand, in the K consecutive slots, redundancy versions (RVs) each applied to a TB based on identical data may be identical to each other, or may be at least partially different from each other. For example, an RV applied to the TB in the n-th slot (transmission occasion, repetition) may be determined on the basis of a value of a certain field (for example, an RV field) in the DCI.

When resources allocated in the K consecutive slots have different communication directions in UL, DL, or flexible, in at least 1 symbol, of each slot specified by at least one of uplink/downlink communication direction indication information for TDD control (for example, an RRC IE "TDD-UL-DL-ConfigCommon" or "TDD-UL-DL-ConfigDedicated") and a slot format identifier (Slot format indicator) of DCI (for example, DCI format 2_0), it may be assumed that resources of a slot including the symbol are not transmitted (or not received).

In Rel. 15, as shown in FIG. 1A, the PUSCH is repetitively transmitted across a plurality of slots (in units of slots), but in Rel. 16 (or later versions), it is assumed that PUSCH repetition transmission is performed in units of anything shorter than the slots (for example, units of sub-slots, units of mini-slots, or units of a certain number of symbols) (see FIG. 1B).

The repetition factor K=4 in FIG. 1B, but a K value is not limited to this. The n-th repetition is also referred to as the n-th transmission occasion or the like, and may be identified by a repetition index k ($0 \leq k \leq K-1$). FIG. 1B shows repetition transmission of a PUSCH (for example, a dynamic grant-based PUSCH) dynamically scheduled by the DCI, but the repetition transmission may be applied to repetition transmission of a configured grant-based PUSCH.

The UE may determine symbol allocation for PUSCH transmission (for example, a PUSCH with k=0) in a certain slot on the basis of a start symbol S and the number of symbols L (for example, StartSymbol and length) determined on the basis of a value m of a certain field (for example, a TDRA field) in DCI for the PUSCH. Note that the UE may determine the certain slot on the basis of Ks information determined on the basis of the value m of the certain field (for example, the TDRA field) of the DCI.

The UE may dynamically receive information (for example, numberofrepetitions) indicating the repetition factor K by using downlink control information. The repetition factor may be determined on the basis of the value m of the certain field (for example, the TDRA field) in the DCI. For example, a table in which correspondence between a bit value, repetition factor K, start symbol S, and the number of symbols L notified by the DCI is defined may be supported.

Slot-based repetition transmission shown in FIG. 1A may be referred to as repetition transmission type A (for example, PUSCH repetition Type A), and sub-slot-based repetition transmission shown in FIG. 1B may be referred to as repetition transmission type B (for example, PUSCH repetition Type B).

Application of at least one of repetition transmission type A and repetition transmission type B may be configured for the UE. For example, a repetition transmission type to be applied by the UE may be notified from the base station to the UE by higher layer signaling (for example, PUSCHRepTypeIndicator).

Any one of repetition transmission type A and repetition transmission type B may be configured for the UE for each DCI format to schedule the PUSCH.

For example, with respect to a first DCI format (for example, DCI format 0_1), when higher layer signaling (for example, PUSCHRepTypeIndicator-AorDCIFormat0_1) is configured for repetition transmission type B (for example, PUSCH-RepTypeB), the UE applies repetition transmission type B to PUSCH repetition transmission scheduled by the first DCI format. In a case other than that (for example, a case where PUSCH-RepTypeB is not configured or a case where PUSCH-RepTypeA is configured), the UE the UE applies repetition transmission type A to PUSCH repetition transmission scheduled by the first DCI format.

For Rel. 16 (or later versions), dynamic switching between single PUSCH transmission and PUSCH repetition transmission is under study.

When a higher layer parameter (for example, pusch-TimeDomainAllocationListDCI-0-1-r16 or pusch-TimeDomainAllocationListDCI-0-2-r16) related to PUSCH time domain allocation is configured for the UE, the number of repetitions (for example, 1, 2, 3, 4, 7, 8, 12, or 16) may be configured by a parameter (for example, numberOfRepetitions-r16) related to the number of PUSCH repetitions included in the higher layer parameter. The UE may judge, on the basis of a time domain resource allocation field of DCI, the number of PUSCH repetitions scheduled by the DCI. When the number of the repetitions is configured/specified to 1, the UE may perform the single PUSCH transmission.

(Invalid Symbol Pattern)

Information related to a symbol (or symbol pattern) unavailable for PUSCH transmission, the information being notified to the UE when repetition transmission type B is applied to the PUSCH transmission, is also under study. The symbol pattern unavailable for the PUSCH transmission may be referred to as an invalid symbol pattern or the like.

Notification of the invalid symbol pattern using at least one of higher layer signaling and DCI is under study. The DCI may be a certain DCI format (for example, at least one of DCI format 0_1 and DCI format 0_2).

For example, information related to the invalid symbol pattern unavailable for the PUSCH transmission is notified to the UE by using a first higher layer parameter. The whether the information related to the invalid symbol pattern is applied may be notified to the UE by using the DCI. In this case, a bit field (field for notification of the whether the invalid symbol pattern) for indicating whether the information related to the invalid symbol pattern is applied may be configured for the DCI.

Whether the notification field (or an additional bit) in the DCI is configured may be notified to the UE by using a second higher layer parameter. In other words, when the information related to the invalid symbol pattern is notified by the first higher layer parameter, the UE may determine whether the information related to the invalid symbol pattern is applied on the basis of the second higher layer parameter and the DCI.

When the first higher layer parameter is not notified or not configured, the UE may control PUSCH transmission without considering the invalid symbol pattern. When the first higher layer parameter is notified or configured, the UE may judge whether the invalid symbol pattern is applied on the basis of the second higher layer parameter and the DCI. For example, when the addition of an additional bit (or certain field) to indicate whether the invalid symbol pattern is applied for the DCI is indicated by the second higher layer parameter, the UE may judge whether the invalid symbol pattern is applied on the basis of the certain field.

It is only necessary that the first higher layer parameter is information to notify a symbol pattern invalid for PUSCH transmission, and, for example, a bitmap form may be applied (see FIG. 2A). FIG. 2A is a diagram to show an example of a case where the invalid symbol pattern is defined by a bitmap (1-D bitmap) in relation to a time domain. The UE may judge, on the basis of information related to the invalid symbol pattern, resources available for the PUSCH transmission in one or more frequency bandwidths (for example, BWPs) (see FIG. 2B).

FIG. 2B shows a case where one or common invalid symbol pattern is applied to a plurality of BWPs, but a different invalid symbol pattern may be configured or applied for each BWP.

(Nominal Repetitions/Actual Repetitions)

When the repetition transmission is performed in units of sub-slots by applying repetition transmission type B, a case where certain repetition transmission crosses a slot boundary (slot-boundary) occurs depending on a repetition factor (K), a data allocation unit, and the like.

Figures 3A, 3B:
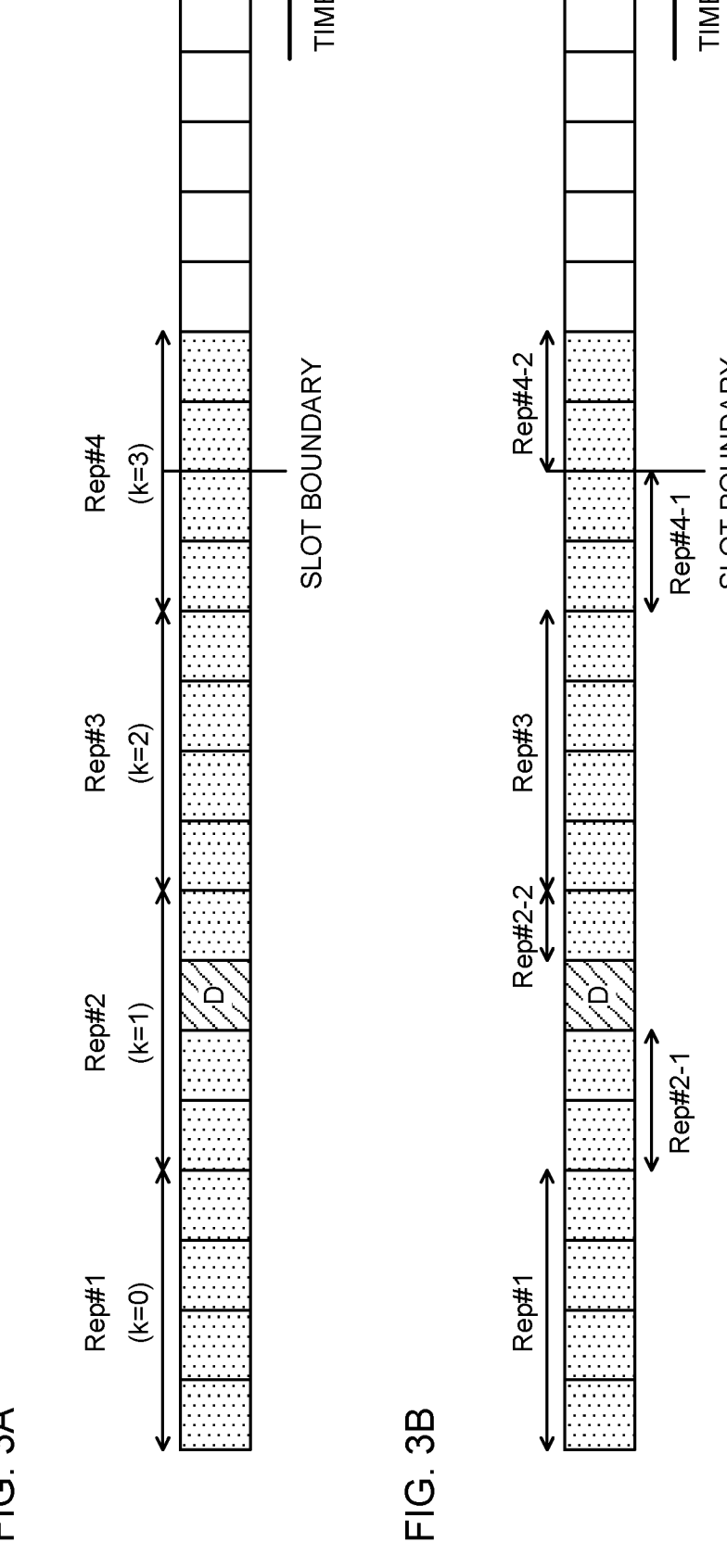
FIGS. 3A and 3B are diagrams to show an example of nominal repetitions and actual repetitions.

FIG. 3A shows an example of a case where repetition transmission type B with a repetition factor (K) being 4 and a PUSCH length (L) being 4 is applied. In FIG. 3A, a PUSCH with k=3 is allocated across the slot boundary. In such a case, the transmission may be performed such that the PUSCH is divided (or segmented) by using the slot boundary as a reference (see FIG. 3B).

A case where a symbol (for example, a DL symbol, an invalid symbol, or the like) unavailable for PUSCH transmission is included in a slot is also assumed. FIG. 3A shows a case where the symbol (here, DL symbol) unavailable for the PUSCH transmission is included in some symbols in which a PUSCH with k=1 is allocated. In such a case, the PUSCH transmission may be performed by using symbols except the DL symbol (see FIG. 3B).

In allocated symbols for a certain PUSCH, when a DL symbol (or invalid symbol) is included in symbols other than symbols on both ends, PUSCH transmission may be performed by using symbols other than a portion of the DL symbol. In this case, the PUSCH may be divided (or segmented).

FIG. 3B shows a case where, in sub-slot-based repetition transmission, a PUSCH with k=1 (Rep #2) is divided into two portions (Rep #2-1 and Rep #2-2) by the DL symbol, and a PUSCH with k=3 (Rep #4) is divided into two portions (Rep #4-1 and Rep #4-2) by the slot boundary.

Note that the repetition transmission before consideration of the DL symbol, invalid symbol, or slot boundary (FIG. 3A) may be referred to as nominal repetitions. The repetition transmission with consideration of the DL symbol, invalid symbol, or slot boundary (FIG. 3B) may be referred to as actual repetitions.

(Spatial Relation for SRS and PUSCH)

In Rel-15 NR, the UE may receive information (SRS configuration information, for example, a parameter in an RRC control element "SRS-Config") used for transmission of a measurement reference signal (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of SRS resources (a certain number of SRS resources may be grouped together). Each SRS resource may be identified by an SRS resource indicator (SRI) or an SRS resource ID (Identifier).

The SRS resource set information may include an SRS resource set ID (SRS-ResourceSetId), a list of SRS resource IDs (SRS-ResourceId) used in the resource set, an SRS resource type (for example, any one of a periodic SRS, a semi-persistent SRS, and aperiodic CSI (Aperiodic SRS)), and information about SRS usage.

Here, the SRS resource type may indicate any one of a periodic SRS (P-SRS), a semi-persistent SRS (SP-SRS), and an aperiodic SRS (A-SRS). Note that the UE may periodically (or, after activation, periodically) transmit the P-SRS and the SP-SRS, and may transmit the A-SRS on the basis of an SRS request of DCI.

The usage (an RRC parameter "usage" or an L1 (Layer-1) parameter "SRS-SetUse") may be, for example, beam management (beamManagement), codebook (CB), non-codebook (noncodebook (NCB)), antenna switching, or the like. An SRS for codebook or non-codebook usage may be used for determination of a precoder for codebook-based or non-codebook-based PUSCH transmission based on the SRI.

For example, in a case of the codebook-based transmission, the UE may determine the precoder for the PUSCH transmission on the basis of an SRI, a transmitted rank indicator (TRI), and a transmitted precoding matrix indicator (TPMI). In a case of the non-codebook-based transmission, the UE may determine the precoder for the PUSCH transmission on the basis of an SRI.

The SRS resource information may include an SRS resource ID (SRS-ResourceId), the number of SRS ports, an SRS port number, a transmission Comb, SRS resource mapping (for example, a time and/or frequency resource location, resource offset, a resource periodicity, the number of repetitions, the number of SRS symbols, an SRS bandwidth, or the like), hopping-related information, an SRS resource type, a sequence ID, SRS spatial relation information, and the like.

The SRS spatial relation information (for example, an RRC information element "spatialRelationInfo") may indicate information about a spatial relation between a certain reference signal and an SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The SRS spatial relation information may include, as an index of the above-described certain reference signal, at least one of an SSB index, a CSI-RS resource ID, and an SRS resource ID.

Note that in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The SRS spatial relation information may include a serving cell index, a BWP index (BWP ID), and the like corresponding to the above-described certain reference signal.

With respect to a certain SRS resource, when spatial relation information related to an SSB or CSI-RS and an SRS is configured, the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam of the SSB or CSI-RS and a UE transmit beam of the SRS are the same.

With respect to a certain SRS (target SRS) resource, when spatial relation information related to another SRS (reference SRS) and the SRS (target SRS) is configured, the UE may transmit the target SRS resource by using the same spatial domain filter (spatial domain transmission filter) as a spatial domain filter (spatial domain transmission filter) for transmission of the reference SRS. In other words, in this case, the UE may assume that a UE transmit beam of the reference SRS and a UE transmit beam of the target SRS are the same.

The UE may determine, on the basis of a value of a certain field (for example, an SRS resource indicator (SRI) field) in DCI (for example, DCI format 0_1), a spatial relation for a PUSCH scheduled by the DCI. Specifically, the UE may use, for PUSCH transmission, spatial relation information (for example, an RRC information element "spatialRelation-Info") about an SRS resource determined on the basis of the value of the certain field (for example, the SRI).

When the codebook-based transmission is used for the PUSCH, two SRS resources per SRS resource set may be configured for the UE by RRC, and one of the two SRS resources may be indicated by DCI (1-bit SRI field). When the non-codebook-based transmission is used for the PUSCH, four SRS resources per SRS resource set may be configured for the UE by RRC, and one of the four SRS resources may be indicated by DCI (2-bit SRI field).

(TPMI and Transmitted Rank)

For Rel. 16, a transmitted precoding matrix indicator (TPMI) and a transmitted rank for codebook-based PUSCH transmission the TPMI and transmitted rank being specified by a specific field (for example, a precoding information and number of layers field) included in downlink control information (for example, DCI format 0_1) are under study.

A precoder used by the UE for the codebook-based PUSCH transmission may be selected from an uplink codebook having the same number of antenna ports as a value configured by a higher layer parameter (for example, nrofSRS-Ports) configured for SRS resources.

A size (number of bits) of the specific field is variable depending on the number of antenna ports for the PUSCH (for example, the number of ports indicated by the above-described nrofSRS-Ports) and several higher layer parameters.

When a higher layer parameter (for example, txConfig) configured for the UE is configured as non-codebook (non-Codebook), the specific field may be 0 bit.

When the higher layer parameter (for example, txConfig) configured for the UE is configured as codebook for one antenna port, the specific field may be 0 bit.

When the higher layer parameter (for example, txConfig) configured for the UE is configured as codebook for four antenna ports, the specific field may have a bit-length of 2 to 6 bits on the basis of at least one of another higher layer parameter configured for the UE and the presence or absence (valid or invalid) of a transform precoder.

When the higher layer parameter (for example, txConfig) configured for the UE is configured as codebook for two antenna ports, the specific field may have a bit-length of 1 to 4 bits on the basis of at least one of another higher layer parameter configured for the UE and the presence or absence (valid or invalid) of the transform precoder.

Such another higher layer parameter may be at least one of a parameter for specifying a UL full power transmission mode (for example, ul-FullPowerTransmission), a parameter indicating a maximum value of a UL transmitted rank (for example, maxRank), a parameter indicating a certain sub-set of precoding matrix indicators (PMIs) (for example, codebookSubset), and a parameter for specifying the transform precoder (for example, transformPrecoder).

(Pathloss RS)

Pathloss $PL_{b,f,c}$ ($q_d$) [dB] in transmission power control for each of an uplink shared channel (Physical Uplink Shared Channel (PUSCH)), an uplink control channel (Physical Uplink Control Channel (PUCCH)), and a reference signal for measurement (Sounding Reference Signal (SRS)) is calculated by the UE with index $q_d$ of a reference signal (RS, pathloss reference RS (PathlossReferenceRS)) for a downlink BWP associated with active UL BWP b for carrier f in serving cell c.

In the present disclosure, the pathloss reference RS, a pathloss (PL)-RS, index $q_d$, an RS used for pathloss calculation, and an RS resource used for pathloss calculation may be interchangeably interpreted. In the present disclosure, calculation, estimation, measurement, and tracking (track) may be interchangeably interpreted.

The PL-RS may be at least one of DL RSs, such as an SSB and a CSI-RS.

For accurate pathloss measurement for transmission power control, up to 4 PL-RSs are configured for a Rel-15 UE by RRC signaling. Even when a UL transmit beam (spatial relation) is updated by a MAC CE, the MAC CE fails to update the PL-RSs.

For a Rel-16 UE, up to 64 PL-RSs are configured by RRC signaling and one PL-RS is indicated (activated) by a MAC CE. The UE is required to track up to 4 active PL-RSs for all UL channels (SRSs, PUCCHs, and PUSCHs). Tracking the PL-RSs may be calculating a pathloss based on PL-RS measurement to hold (store) the pathloss.

When a TCI state for a PDCCH or a PDSCH is updated by the MAC CE, a PL-RS may also be updated to the TCI state.

(Default Spatial Relation and Default PL-RS)

In Rel-15 NR, respective ones of a PUCCH spatial relation activation/deactivation MAC CE and an SRS spatial relation activation/deactivation MAC CE are necessary. A PUSCH spatial relation follows an SRS spatial relation.

In Rel-16 NR, at least one of the PUCCH spatial relation activation/deactivation MAC CE and the SRS spatial relation activation/deactivation MAC CE may not be used.

As a spatial relation used by the UE in a case where spatial relations are unavailable (for example, unidentifiable, unspecified, or deactivated) for UL transmission, a default spatial relation is under study. As a PL-RS used in a case where PL-RSs are unavailable for the UL transmission (same as above) or a case where the default spatial relation is used for the UL transmission, a default PL-RS is under study. In the present disclosure, UE operation using these default spatial relation/default PL-RS may be referred to as default beam operation.

For example, a spatial relation used for transmission of a PUSCH scheduled by DCI format 0_0 may be referred to as a default spatial relation, and a PL-RS used for (downlink pathloss estimation in) transmission power control for this PUSCH may be referred to as a default PL-RS. Determination of the default spatial relation/default PL-RS in Rel. 15/16 will be described below.

In Rel. 15, a spatial relation for a PUSCH scheduled by DCI format 0_0 follows a spatial relation (active spatial relation) corresponding to a PUCCH resource having the lowest PUCCH resource ID in active UL BWPs in the same cell.

In Rel. 16, a spatial relation for a PUSCH scheduled by DCI format 0_0 in a certain cell follows a spatial relation for reference to a QCL type D RS corresponding to QCL assumption for a CORESET having the lowest ID in an active DL BWP in the above-described cell when a parameter for enabling a default beam for the PUSCH (enableDefaultBeamPL-ForPUSCH0-0) is set to "enabled," and a PUCCH resource for an active UL BWP is not configured for the UE (or the PUCCH resource is configured for the UE, but spatial relations are not configured for all PUCCH resources). Otherwise, the spatial relation for the PUSCH scheduled by DCI format 0_0 is similar to that of Rel. 15.

When higher layer parameters "PUSCH-PathlossReferenceRS" and "enableDefaultBeamPL-ForSRS" are not provided for the UE or before a specific higher layer parameter is provided for the UE, the UE computes a downlink pathloss by using an RS resource from an SS/PBCH block having the same index as an SS/PBCH block index used for the UE to acquire an MIB. This RS corresponds to the default PL-RS.

When PUSCH transmission is scheduled by using DCI format 0_0, and spatial relation configuration (spatial setting) is provided for a PUCCH resource with the lowest index in an active UL BWP for each carrier and serving cell by using a higher layer parameter "PUCCH-SpatialRelationInfo," the UE uses, in the PUSCH transmission as $q_d$ for downlink pathloss estimation, the same RS resource index as that in a case of PUCCH transmission in a PUCCH resource having the lowest index.

In Rel. 16, when PUSCH transmission is not scheduled by using DCI format 0_0, a higher layer parameter "enableDefaultBeamPL-ForSRS-r16" is provided for the UE, and higher layer parameters "PUSCH-PathlossReferenceRS" and "PUSCH-PathlossReferenceRS-r16" are not provided for the UE, the UE uses, in the PUSCH transmission as $q_d$ for downlink pathloss estimation, the same RS resource index as that of an SRS resource set having an SRS resource associated with PUSCH transmission.

When PUSCH transmission is scheduled by using DCI format 0_0, and spatial relation configuration for PUCCH transmission is not provided for the UE, when PUSCH transmission is scheduled by using DCI format 0_1 or DCI format 0_2 not including an SRI field, or when a higher layer parameter "SRI-PUSCH-PowerControl" is not provided for the UE, the UE uses, as $q_d$ for downlink pathloss estimation, an RS resource index with a value of corresponding PUSCH-PathlossReferenceRS-Id equal to 0. Note that this RS resource may be present on a serving cell in which the above-described PUSCH is transmitted, or may, when a higher layer parameter "pathlossReferenceLinking" is provided, be present on a serving cell indicated by this value.

In Rel. 16, a PL-RS for a PUSCH scheduled by DCI format 0_0 in a certain cell is an RS corresponding to an RS resource index for providing a QCL type D periodic RS resource corresponding to QCL assumption for a CORESET having the lowest ID in an active DL BWP in the above-described cell when a parameter for enabling a default beam for the PUSCH (enableDefaultBeamPL-ForPUSCH0-0) is set to "enabled," and a PUCCH resource for an active UL BWP is not configured for the UE (or the PUCCH resource is configured for the UE, but spatial relations are not configured for all PUCCH resources).

(Multi-TRP)

Figure 4:
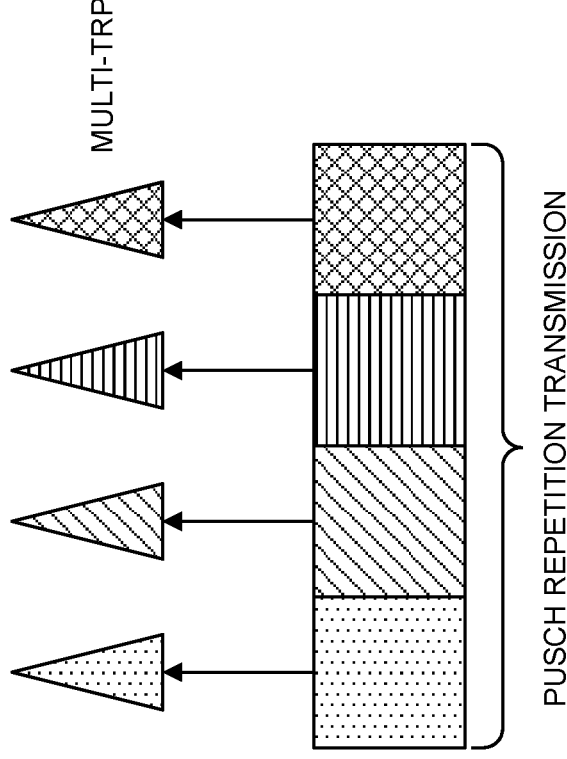
FIG. 4 is a diagram to show an example of PUSCH repetition transmission in multi-TRP.

For NR, one or a plurality of transmission/reception points (TRPs) (multiple TRPs) that perform DL transmission to a UE by using one or a plurality of panels (multiple panels) are under study. The UE that performs UL transmission to one or a plurality of TRPs is under study (see FIG. 4).

The plurality of TRPs may correspond to the same cell identifier (ID), or may correspond to different cell IDs. The cell ID may be a physical cell ID, or may be a virtual cell ID.

(Mapping Pattern)

When determining to perform PUSCH repetition transmission for multiple TRPs, the UE may judge that a plurality of SRIs and a plurality of repetition transmissions corre-spond to each other on the basis of a specific rule. The rule may be referred to as a mapping pattern, a mapping rule, a correspondence pattern, correspondence, or the like. The UE may assume that the number of PUSCH repetitions exceeds the number of beams used for the PUSCH transmission.

For example, when determining to perform the PUSCH repetition transmission for the multiple TRPs, the UE may judge that the plurality of pieces of SRI cyclically corre-spond to the plurality of repetition transmissions. The cor-respondence may be referred to as cyclic mapping, a cyclic pattern, cyclic correspondence, or the like.

Figure 6:
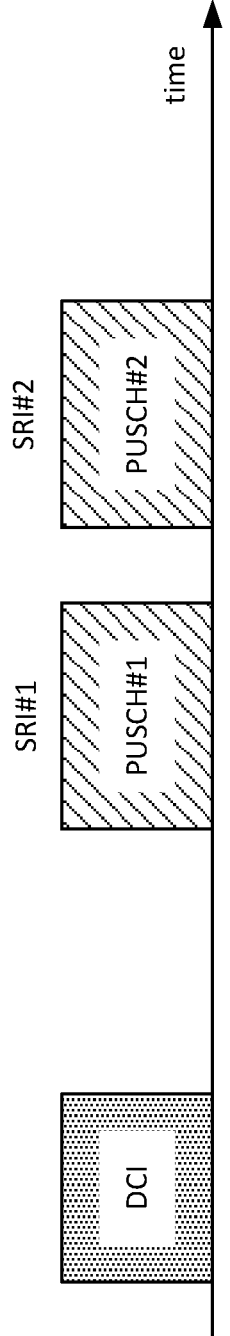
FIG. 6 is a diagram to show an example of single DCI-based PUSCH repetition transmission for multiple TRPs.

FIG. 5A is a diagram to show an example in which the plurality of SRIs and the plurality of repetition transmissions cyclically correspond to each other. In FIG. 5A, 6 is speci-fied for the UE as the number of repetitions, and the UE performs PUSCH repetition transmission using a first SRI and a second SRI. In the example shown in FIG. 5A, the UE cyclically performs PUSCH transmission using the first SRI and PUSCH transmission using the second SRI. For example, the first SRI may be applied to odd-numbered repetition (repetition #1, repetition #3, repetition #5), and the second SRI may be applied to even-numbered repetition (repetition #0, repetition #2, repetition #4).

For example, when determining to perform PUSCH rep-etition transmission in multiple TRPs, the UE may judge that the plurality of SRIs sequentially correspond to the plurality of repetition transmissions for each specific numbers of (for example, two) repetition transmissions. The correspondence may be referred to as sequential mapping, a sequential pattern, sequential correspondence, or the like.

FIG. 5B is a diagram to show an example in which the plurality of SRIs and the plurality of repetition transmissions sequentially correspond to each other. In FIG. 5B, 6 is specified for the UE as the number of repetitions, and the UE performs PUSCH repetition transmission using a first SRI and a second SRI. In the example shown in FIG. 5B, the UE sequentially performs two PUSCH transmissions using the first SRI and two PUSCH transmissions using the second SRI.

For example, when the UE determines to perform the PUSCH repetition transmission in the multiple TRPs, the plurality of SRIs and the plurality of repetition transmissions may successively correspond to each other such that the successive correspondence roughly matches to a number obtained by dividing the number of repetitions by the number of SRIs. When the number of SRIs is 2, the correspondence may be referred to as a half-half pattern (mapping).

FIG. 5C is a diagram to show an example in which the half-half pattern is used for correspondence between the plurality of SRIs and the plurality of repetition transmis-sions. In FIG. 5C, 6 is specified for the UE as the number of repetitions, and the UE performs PUSCH repetition trans-mission using a first SRI and a second SRI. In the example shown in FIG. 5C, the UE performs PUSCH transmissions using the first SRI in the first half of (first three) PUSCH transmission occasions, and performs PUSCH transmissions using the second SRI in the second half of (three subsequent) the PUSCH transmission occasions.

Note that one mapping pattern to be used out of a plurality of mapping patterns described by using the above-described FIGS. 5A to 5C may be defined in specifications. The plurality of mapping patterns may be defined in the speci-fications, and a mapping pattern to be applied may be configured/indicated for the UE by using at least one of higher layer signaling and physical layer signaling. The UE may report, to the NW, a UE capability related to application of which mapping pattern out of a plurality of mapping patterns is to be supported.

Note that the number of PUSCH repetition transmissions, the number of SRIs, and the like shown in FIGS. 5A to 5C are just an example, and are not limited to these. The numbers of PUSCH repetition transmissions, the numbers of codepoints/names of codepoints of respective fields, the numbers of bits, the numbers of SRIs, and the like in the drawings below are just examples, and are not limited to these examples.

The above-mentioned mapping pattern may be applied to correspondence between a plurality of TPMIs/TPC com-mands and a plurality of PUSCHs.

FIG. 6 is a diagram to show an example of single DCI-based PUSCH repetition transmission for the multiple TRPs. In FIG. 6, the UE performs two PUSCH repetition transmissions. Information (RS resource) related to an SRI applied to each of PUSCH #1 and PUSCH #2 is indicated for the UE, the information being included in one piece of DCI (single DCI).

Incidentally, for NR specifications thus far, how to control PUSCH repetition transmission in multiple panels/TRPs (in a case where multiple panels/TRPs are configured) has not been fully studied. Unless PUSCH repetition transmission in multi-TRP is appropriately performed, throughput reduction or communication quality degradation may occur.

More specifically, a method for determining a spatial relation for a PUSCH scheduled by a specific DCI format (for example, DCI format 0_0) and how to control a default spatial relation/PL-RS for single DCI-based PUSCH repeti-tion transmission have not been fully studied. Thus, the inventors of the present invention came up with the idea of a PUSCH repetition transmission control method for resolv-ing the above-described issue.

Embodiments according to the present disclosure will be described in detail with reference to the drawings as follows. The radio communication methods according to respective embodiments may each be employed individually, or may be employed in combination.

Note that in the present disclosure, a port, a panel, a beam, an Uplink (UL) transmission entity, a TRP, spatial relation information (SRI), a spatial relation, a control resource set (COntrol REsource SET (CORESET)), a PDSCH, a code-word, a base station, a certain antenna port (for example, a demodulation reference signal (DMRS) port), a certain antenna port group (for example, a DMRS port group), a certain group (for example, a code division multiplexing (CDM) group, a certain reference signal group, a CORESET group, a panel group, a beam group, a spatial relation group, or a PUCCH group), and a CORESET pool may be inter-changeably interpreted. A panel Identifier (ID) and a panel may be interchangeably interpreted. A TRP ID and a TRP may be interchangeably interpreted.

In the present disclosure, an index, an ID, an indicator, and a resource ID may be interchangeably interpreted.

In the present disclosure, "A/B" may mean "at least one of A and B." In the present disclosure, "A/B/C" may mean "at least one of A, B, and C."

In the present disclosure, a list, a group, a cluster, a sub-set, and the like may be interchangeably interpreted. In the present disclosure, spatial relation information (SRI), an SRS resource indicator (SRI) (or SRI field), an SRS resource, a precoder, and the like may be interchangeably interpreted.

In the present disclosure, spatial relation information (SRI), a combination of pieces of SRI, SRI for codebook-based transmission, a combination of pieces of non-codebook-based SRI, spatialRelationInfo, a UL TCI, a TCI state, a Unified TCI, QCL, and the like may be interchangeably interpreted.

In the present disclosure, a first TRP and a second TRP and each of a first PUSCH and a second PUSCH, a first PUSCH transmission occasion and a second PUSCH transmission occasion, a first SRI and a second SRI, and the like may be interchangeably interpreted.

PUSCH repetition transmission for a plurality of TRPs in embodiments below and each of a PUSCH across a plurality of TRPs, PUSCH repetition across a plurality of TRPs, just PUSCH repetition, repetition transmission, a plurality of PUSCH transmissions, and the like may be interchangeably interpreted. Single PUSCH transmission for a single TRP may be referred to as just single PUSCH transmission, PUSCH transmission in a single TRP, or the like.

In the present disclosure, PUSCH repetition transmission for a single TRP may mean repetition transmission of a plurality of PUSCHs transmitted by using the same SRI/beam/precoder.

In the present disclosure, PUSCH repetition transmission for multiple TRPs may mean repetition transmission of a plurality of PUSCHs transmitted by using a plurality of different SRIs/beams/precoders. As mentioned above, the repetition transmission and the plurality of SRIs/beams/precoders may cyclically correspond to each other, may sequentially correspond to each other for respective specific numbers of repetition transmissions, or may be correspondence using the half-half pattern (mapping).

In the present disclosure, determination of a spatial relation/TCI state for a PUSCH may be interpreted as determination of a reference signal (index) applied to (used for) a spatial relation/PL-RS for the PUSCH.

Note that each embodiment in the present disclosure will be described by using, as an example, PUSCH transmission for a plurality of TRPs using one piece of DCI and codebook-based PUSCH transmission, but may be employed in non-codebook-based PUSCH transmission, and PUSCH transmission in which each embodiment can be employed is not limited to these. When each embodiment in the present disclosure is employed in the non-codebook-based PUSCH transmission, one or more SRS resources (SRIs) may be indicated for the UE by each SRI field. A common embodiment or different embodiments may be employed in the codebook-based PUSCH transmission and the non-codebook-based PUSCH transmission.

Each embodiment in the present disclosure will be described by using, as a main example, a case where the numbers of multiple TRPs, multiple SRIs, and the like are 2, but the numbers of these may be 3 or more. A "dynamic switch" in the present disclosure may mean a "switch using at least one of higher layer signaling and physical layer signaling." A "switch" of the present disclosure and each of switching, a change, changing, application, and the like may be interchangeably interpreted.

(Radio Communication Method)

First Embodiment

In a first embodiment, single DCI-based PUSCH repetition transmission (S-DCI based PUSCH repetition) may be configured for a UE, and a PUSCH is scheduled by using a DCI format (for example, DCI format 0_0) not having (or not including) an SRI field. A case that the single DCI-based PUSCH repetition transmission is configured for the UE may be a case that a plurality of SRI fields/TPMI fields/TPC command fields are configured in a specific DCI format (for example, DCI format 0_1/0_2).

When a PUSCH is scheduled by using a specific DCI format (for example, DCI format 0_0), the UE may not perform repetition transmission of the PUSCH (or may assume that the PUSCH is not repetitively transmitted (or is transmitted once)) (Embodiment 1-1). That is, when the PUSCH is scheduled by using the specific DCI format (for example, DCI format 0_0), the UE may control so as to perform transmission of the PUSCH on the basis of operation defined in Rel. 15 (or earlier versions).

When a PUSCH is scheduled by using a specific DCI format (for example, DCI format 0_0), the UE may repetitively perform transmission of the PUSCH X times (X is an arbitrary integer) (Embodiment 1-2). Note that in the present disclosure, this "X" may mean the number of beams applied to PUSCH repetition transmission, and may be different from the number of PUSCH repetitions.

In Embodiment 1-2, when at least one of condition 1 to condition 4 described below is satisfied for the UE, the UE may, even when a PUSCH is scheduled by using a specific DCI format (for example, DCI format 0_0), repetitively perform transmission of the PUSCH X times (X is an arbitrary integer).

Condition 1: A plurality of spatial relations are configured for a PUCCH resource (associated PUCCH resource) used for determining a PL-RS/spatial relation for the PUSCH.

Condition 2: A plurality of TCI states are configured for a CORESET (associated CORESET) used for determining a PL-RS/spatial relation for the PUSCH.

Condition 3: A plurality of TCI states are configured for an SRS resource (associated SRS resource) used for determining a PL-RS/spatial relation for the PUSCH.

Condition 4: A higher layer parameter to configure/enable/activate repetition transmission of a PUSCH scheduled by using a specific DCI format (for example, DCI format 0_0) is configured.

With respect to condition 1 to condition 3, a case that a plurality of spatial relations/TCI states are configured for the PUCCH resource/CORESET/SRS resource may mean that a plurality of spatial relations/TCI states are configured for a PUCCH resource/CORESET/SRS resource or an RS (CSI-RS, SSB, SRS, or the like) as a reference target for a default PL-RS/default spatial relation determined in accordance with Rel. 15/16 mentioned above.

In place of condition 1 to condition 3 or in addition to these, condition 5 below may be used to judge, when a PUSCH is scheduled by using a specific DCI format (for example, DCI format 0_0), whether repetition transmission of the PUSCH is allowed:

Condition 5: A plurality of spatial relations/TCI states are configured for a PUCCH resource/CORESET/SRS resource or an RS (CSI-RS, SSB, SRS, or the like) as a reference target for a PL-RS/spatial relation for the PUSCH.

Note that the above-described X may be defined beforehand in specifications (for example, X=2), may be configured by using higher layer signaling, or may be a value reported to a network (NW) as a UE capability.

PL-RS/Spatial Relation for PUSCH Transmission in Embodiment 1-1

A method for determining one PL-RS/spatial relation for PUSCH transmission in Embodiment 1-1 described above will be described below.

The UE may assume (expect) that one spatial relation/TCI state is configured for/related to a PUCCH resource/CORESET/SRS resource used for determining a PL-RS/spatial relation for the PUSCH.

When one spatial relation/TCI state is configured for/related to the PUCCH resource/CORESET/SRS resource used for determining the PL-RS/spatial relation for the PUSCH, the UE may assume that the one spatial relation/TCI state is a default PL-RS/spatial relation for the PUSCH.

When a plurality of spatial relations/TCI states are configured for/related to the PUCCH resource/CORESET/SRS resource used for determining the PL-RS/spatial relation for the PUSCH, the UE may determine/select, as the default PL-RS/spatial relation for the PUSCH, one spatial relation/TCI state from the plurality of spatial relations/TCI states.

The UE may determine/select, as the default PL-RS/spatial relation for the PUSCH, one spatial relation/TCI state corresponding to at least one of rule 1 to rule 5 described below from the plurality of spatial relations/TCI states:

Rule 1: A spatial relation/TCI state corresponding to the highest (lowest) spatial relation ID/TCI state ID;

Rule 2: A spatial relation/TCI state corresponding to the highest (lowest) PUCCH resource ID/CORESET ID/SRS resource ID;

Rule 3: A spatial relation/TCI state corresponding to a first/second spatial relation ID/TCI state ID/PUCCH resource ID/CORESET ID/SRS resource ID in a case where a first/second beam/resource is configured for each PUCCH resource/CORESET/SRS resource;

Rule 4: One spatial relation/TCI state determined/selected in accordance with a specific rule configured by using higher layer signaling; and Rule 5: A spatial relation/TCI state corresponding to a specific (exact) spatial relation ID/TCI state ID configured/indicated by using higher layer signaling.

PL-RS/Spatial Relation for PUSCH Transmission in Embodiment 1-2

A method for determining a plurality of PL-RSs/spatial relations for PUSCH repetition transmission in Embodiment 1-2 described above will be described below.

The UE may assume (expect) that X spatial relations/TCI states are configured for/related to a PUCCH resource/CORESET/SRS resource used for determining a PL-RS/spatial relation for the PUSCH.

When X spatial relations/TCI states are configured for/related to the PUCCH resource/CORESET/SRS resource used for determining the PL-RS/spatial relation for the PUSCH, the UE may assume that the X spatial relations/TCI states are default PL-RSs/spatial relations for the PUSCH in each PUSCH transmission occasion.

When more than X spatial relations/TCI states are configured for/related to the PUCCH resource/CORESET/SRS resource used for determining the PL-RS/spatial relation for the PUSCH, the UE may determine/select, as the default PL-RSs/spatial relations for the PUSCH, X spatial relations/TCI states from the more than X spatial relations/TCI states.

The UE may determine/select, as the default PL-RSs/spatial relations for the PUSCH, X spatial relations/TCI states corresponding to at least one of rule 1 to rule 5 described below from the more than X spatial relations/TCI states:

Rule 1: Spatial relations/TCI states corresponding to X spatial relation IDs/TCI state IDs in descending order (ascending order) starting from the highest (lowest) spatial relation ID/TCI state ID;

Rule 2: Spatial relations/TCI states corresponding to X PUCCH resource IDs/CORESET IDs/SRS resource IDs in descending order (ascending order) starting from the highest (lowest) PUCCH resource ID/CORESET ID/SRS resource ID;

Rule 3: Spatial relations/TCI states corresponding to first/second spatial relation IDs/TCI state IDs/PUCCH resource IDs/CORESET IDs/SRS resource IDs in a case where a first/second beam/resource is configured for each PUCCH resource/CORESET/SRS resource;

Rule 4: X spatial relations/TCI states determined/selected in accordance with a specific rule configured by using higher layer signaling; and Rule 5: Spatial relations/TCI states corresponding to X specific (exact) spatial relation IDs/TCI state IDs configured/indicated by using higher layer signaling.

Note that X spatial relations/TCI states may be determined/selected by combining two or more rules out of the above-described rules. For example, the UE may determine, out of X spatial relations/TCI states to be determined, A (A is a number less than X) spatial relations/TCI states by using a certain rule, and may subsequently determine X-A spatial relations/TCI states by using another rule.

When less than X (Y (for example, Y=1)) spatial relations/TCI states are configured for/related to the PUCCH resource/CORESET/SRS resource used for determining the PL-RS/spatial relation for the PUSCH, the UE may assume that the Y spatial relations/TCI states are default PL-RSs/spatial relations for the PUSCH.

Subsequently, the UE may determine X-Y remaining spatial relations/TCI states corresponding to at least one of rule 6 and rule 7 described below:

Rule 6: A spatial relation/TCI state corresponding to the N th (N is an integer being two or more)/highest/lowest PUCCH resource ID/CORESET ID; and Rule 7: A spatial relation/TCI state corresponding to a specific (exact) spatial relation ID/TCI state ID configured/indicated by using higher layer signaling, the spatial relation/TCI state being used for determination of Y spatial relations/TCI states.

According to the above first embodiment, it is possible to appropriately determine a spatial relation/PL-RS for a PUSCH even when PUSCH repetition transmission is scheduled by using DCI format 0_0.

Second Embodiment

In a second embodiment, a UE may apply, by using a method described in the first embodiment, a default PL-RS/spatial relation to PUSCH repetition transmission scheduled by using a specific DCI format (for example, DCI format 0_1/0_2) having an SRI field.

Figures 7A, 7B:
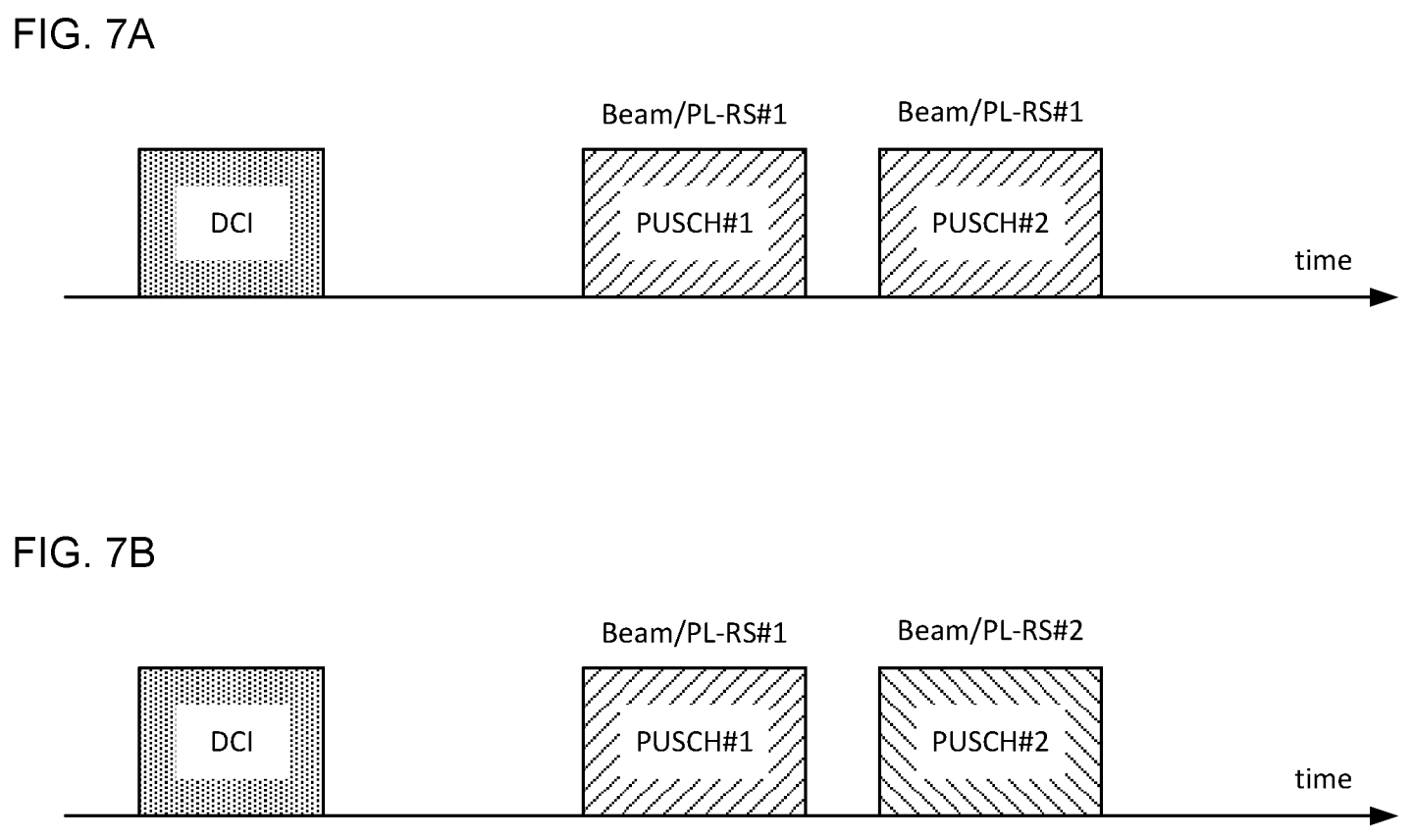

FIG. 7A is a diagram to show an example of the PUSCH repetition transmission in existing Rel. 15/16. In FIG. 7A, a common beam/PL-RS (beam/PL-RS #1) is configured/indicated for PUSCH repetition transmissions (PUSCH #1 and PUSCH #2) scheduled by using single piece of DCI. FIG. 7B is a diagram to show an example of the PUSCH repetition transmission according to the second embodiment. In FIG. 7B, a different beam/PL-RS (beam/PL-RS #1 or beam/PL-RS #2) is configured/indicated for each of the PUSCH repetition transmissions (PUSCH #1 and PUSCH #2) scheduled by using the single piece of DCI. In the present embodiment, switching between such operations as shown in FIGS. 7A and 7B will be described.

In the second embodiment, "when a PUSCH is scheduled by using a specific DCI format (for example, DCI format 0_0) for the UE" in the first embodiment may be interpreted as "when a PUSCH for which default beam operation is configured is scheduled for the UE" or "when a PUSCH for which a PL-RS/spatial relation is not configured is scheduled."

Unlike PUSCH-related default beam operation in Rel. 16, the UE may assume that different beams/PL-RSs are configured for respective repetitions (transmission occasions).

When a specific higher layer parameter (for example, enableDefaultBeamPL-ForSRS_r17) defined in Rel. 17 (or later versions) is configured, the UE may assume that different beams/PL-RSs are configured/indicated for respective transmission occasions for the PUSCH repetition transmission.

When a specific higher layer parameter (for example, enableDefaultBeamPL-ForSRS) is configured, and PUSCH repetition transmission is scheduled by using a specific DCI format (for example, DCI format 0_1/0_2) including a plurality of SRI fields/TPMI fields/TPC command fields, the UE may assume that different beams/PL-RSs are configured/indicated for respective transmission occasions for the PUSCH repetition transmission.

In at least one of a case where a PUSCH for which default beam operation is configured is scheduled for the UE and a case where a PUSCH for which a PL-RS/spatial relation is not configured is scheduled for the UE, a specific DCI format (for example, DCI format 0_1/0_2) to schedule the PUSCH may not include a specific field (for example, an SRI field).

When at least one of the specific higher layer parameter (for example, enableDefaultBeamPL-ForSRS) and the specific higher layer parameter (for example, enableDefaultBeamPL-ForSRS_r17) defined in Rel. 17 (or later versions) is configured, the UE may assume that a specific DCI format (for example, DCI format 0_1/0_2) to schedule a PUSCH does not include a specific field (for example, an SRI field).

In at least one of a case where a PUSCH for which default beam operation is configured is scheduled for the UE and a case where a PUSCH for which a PL-RS/spatial relation is not configured is scheduled for the UE, a specific DCI format (for example, DCI format 0_1/0_2) to schedule the PUSCH may include a specific field (for example, a TPMI field/TPC command field).

In at least one of a case where a PUSCH for which default beam operation is configured is scheduled for the UE and a case where a PUSCH for which a PL-RS/spatial relation is not configured is scheduled for the UE, a specific DCI format (for example, DCI format 0_1/0_2) to schedule the PUSCH may not include a specific field (for example, a TPMI field/TPC command field). The UE may determine/judge a TPMI field value/TPC command field value on the basis of a specific rule. The specific rule may be defined beforehand in specifications, or may be configured for the UE by using higher layer signaling.

Figures 8A, 8B:
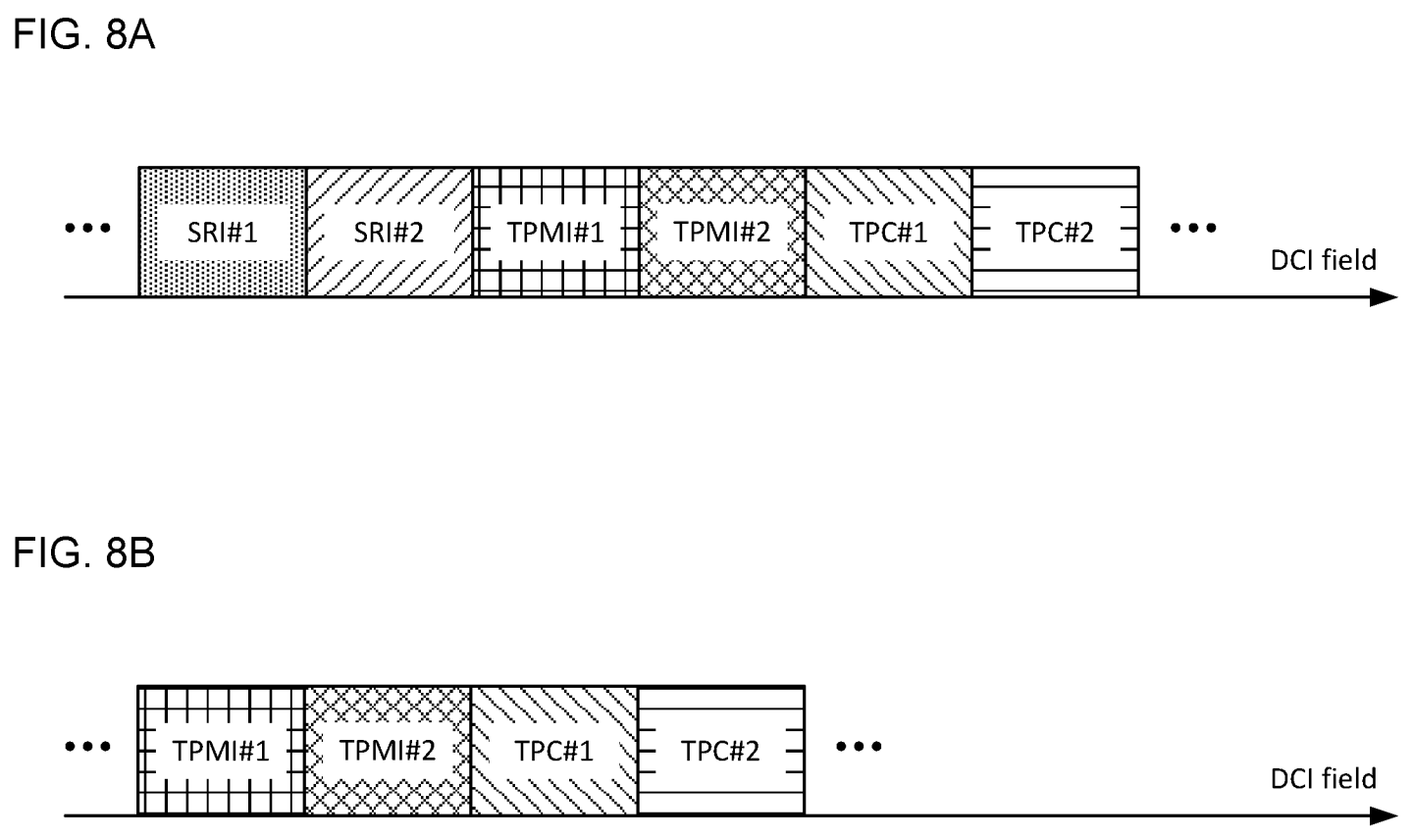

FIGS. 8A and 8B are each a diagram to show an example of the DCI format to configure single DCI-based PUSCH repetition transmission. In the example shown in FIG. 8A, the DCI format includes two SRI fields (SRI #1 and SRI #2), two TPMI fields (TPMI #1 and TPMI #2), and two TPC command fields (TPC #1 and TPC #2). On the other hand, in the example of FIG. 8B showing DCI for the PUSCH for which the default beam operation is configured, the DCI format includes two TPMI fields (TPMI #1 and TPMI #2) and two TPC command fields (TPC #1 and TPC #2).

As shown in FIGS. 8A and 8B, the DCI format related to the default beam operation is defined, thereby allowing DCI overhead to be reduced.

According to the above second embodiment, it is possible to appropriately determine a spatial relation/PL-RS for a PUSCH even when PUSCH repetition transmission is scheduled by using DCI format 0_1/0_2.

<Variation>

Even when a specific higher layer parameter (for example, enableDefaultBeamPL-ForSRS) is configured for the UE, and a PUSCH is scheduled for the UE by using a DCI format (for example, DCI format 0_1/0_2) including a plurality of specific fields (for example, SRI fields/TPMI fields/TPC command fields), the UE may perform PUSCH repetition transmission operation defined in Rel. 15/16 (such operation using one default spatial relation/PL-RS as shown in FIG. 7A).

The UE that performs the single DCI-based PUSCH repetition transmission may not perform the operation using the default spatial relation/PL-RS. In other words, for the UE that performs the single DCI-based PUSCH repetition transmission, it may be assumed that a spatial relation/PL-RS for the PUSCH is always configured.

Third Embodiment

Each embodiment of the present disclosure may be employed under a condition of at least one of a case where a UE has reported, to a NW, a UE capability corresponding to at least one described below and a case where the UE capability for at least one described below has been configured/activated/indicated for the UE by higher layer signaling. Each embodiment of the present disclosure may be employed in a case where a specific higher layer parameter has been configured/activated/indicated for the UE.

The UE capability may be defined by whether single DCI-based PUSCH repetition transmission for multiple TRPs is supported.

The UE capability may be defined by whether different SRI fields/TPMI fields/TPC command fields are supported for respective transmission occasions for PUSCH repetition transmission.

The UE capability may be defined by the number of PUSCH repetitions.

The UE capability may be defined by the number of active beams/the number of PL-RSs for PUSCH repetition transmission.

The UE capability may be defined by whether a default spatial relation/PL-RS for PUSCH repetition transmission is supported.

The UE capability may be defined by whether a default spatial relation/PL-RS for PUSCH repetition transmission for determining one beam/PL-RS for each PUCCH resource/CORESET/SRS resource in Embodiment 1-1 is supported.

According to an above third embodiment, the UE can achieve a method described in the above-mentioned embodiment while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
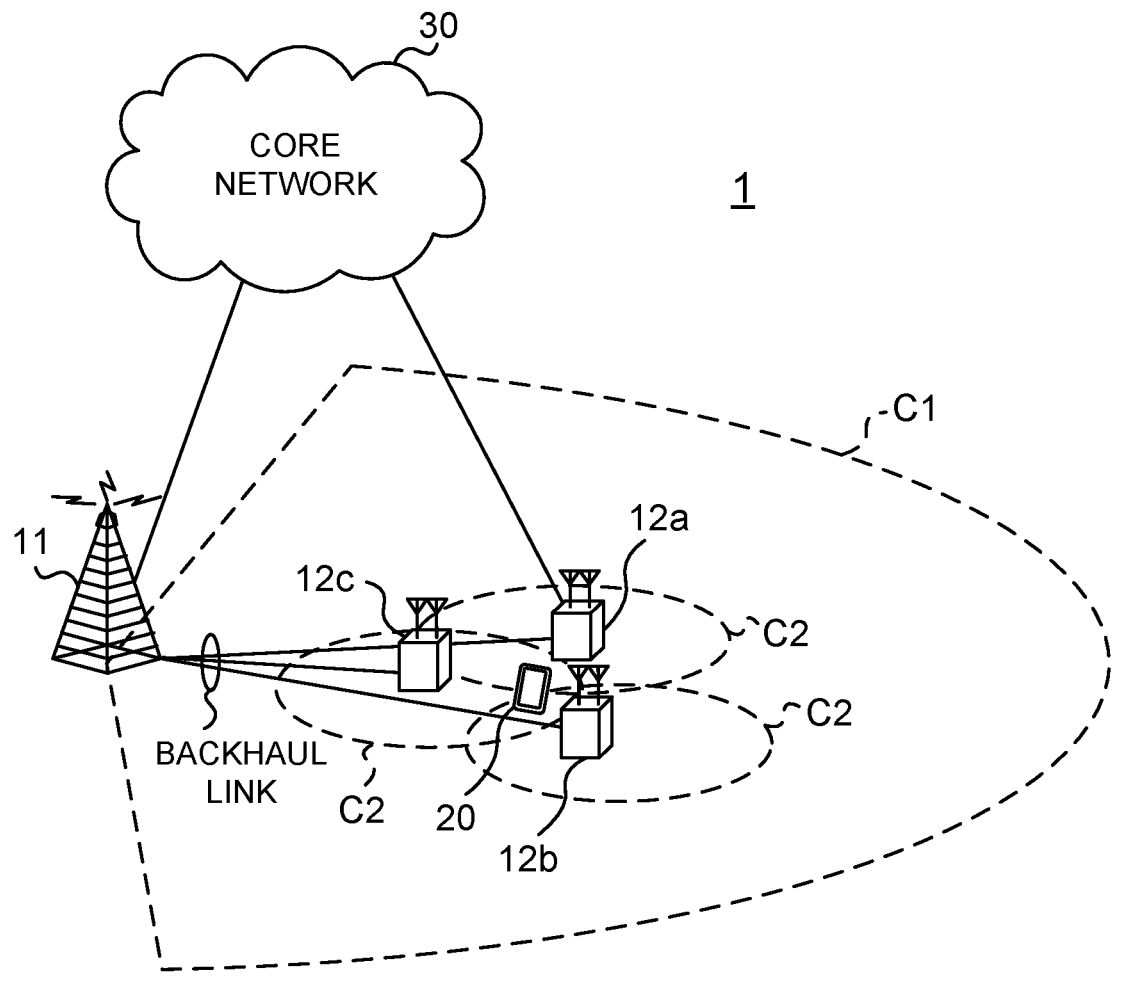
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRHs) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
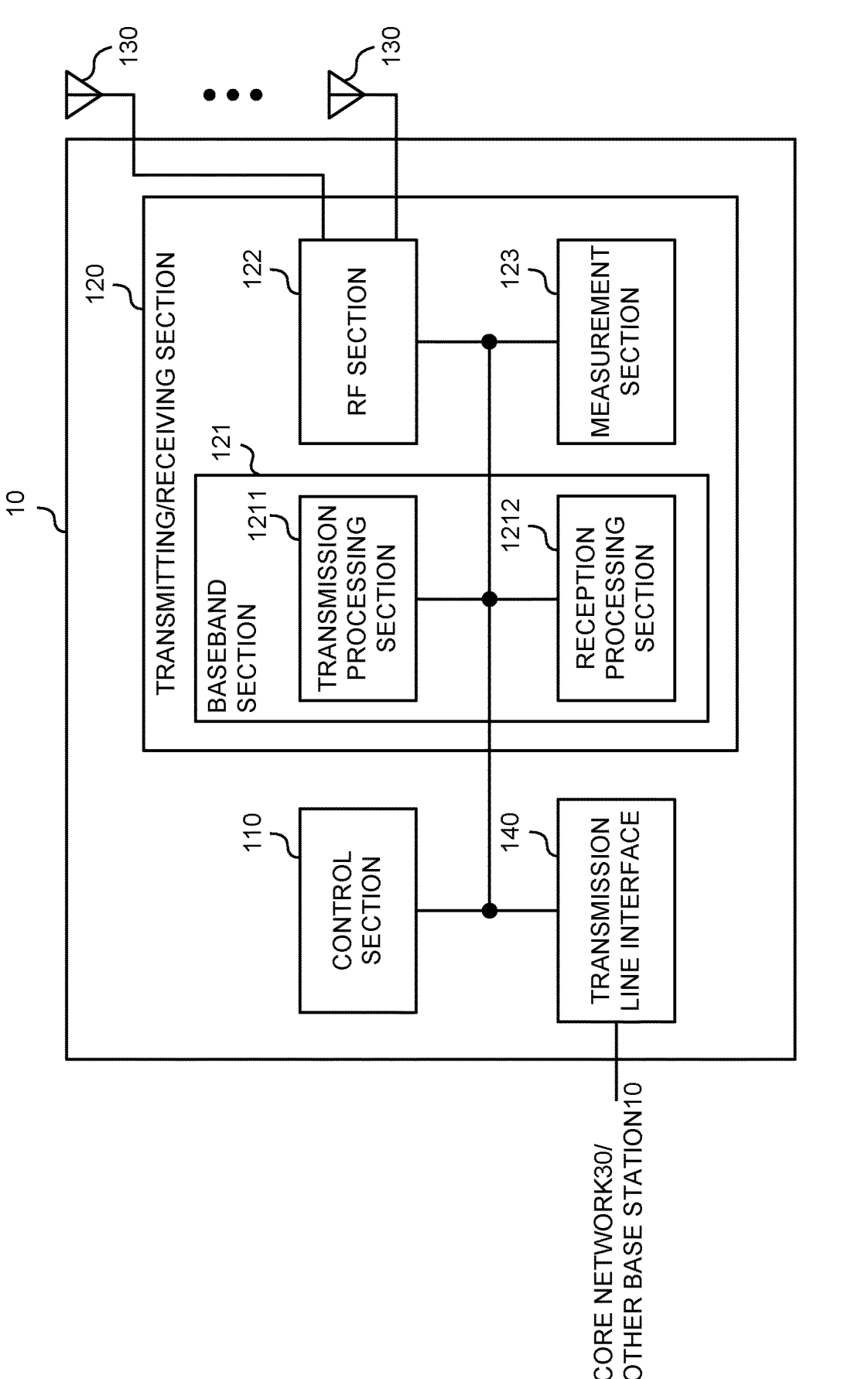
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information related to configuration of transmission of a plurality of physical uplink shared channels (PUSCHs) based on one piece of downlink control information (DCI). The control section 110 may control reception of the plurality of PUSCHs to which at least one of spatial relations and pathloss reference signals (PL-RSs) for which one or more reference signal indices of a plurality of reference signal indices are used is applied (first and second embodiments).

(User Terminal)

Figure 11:
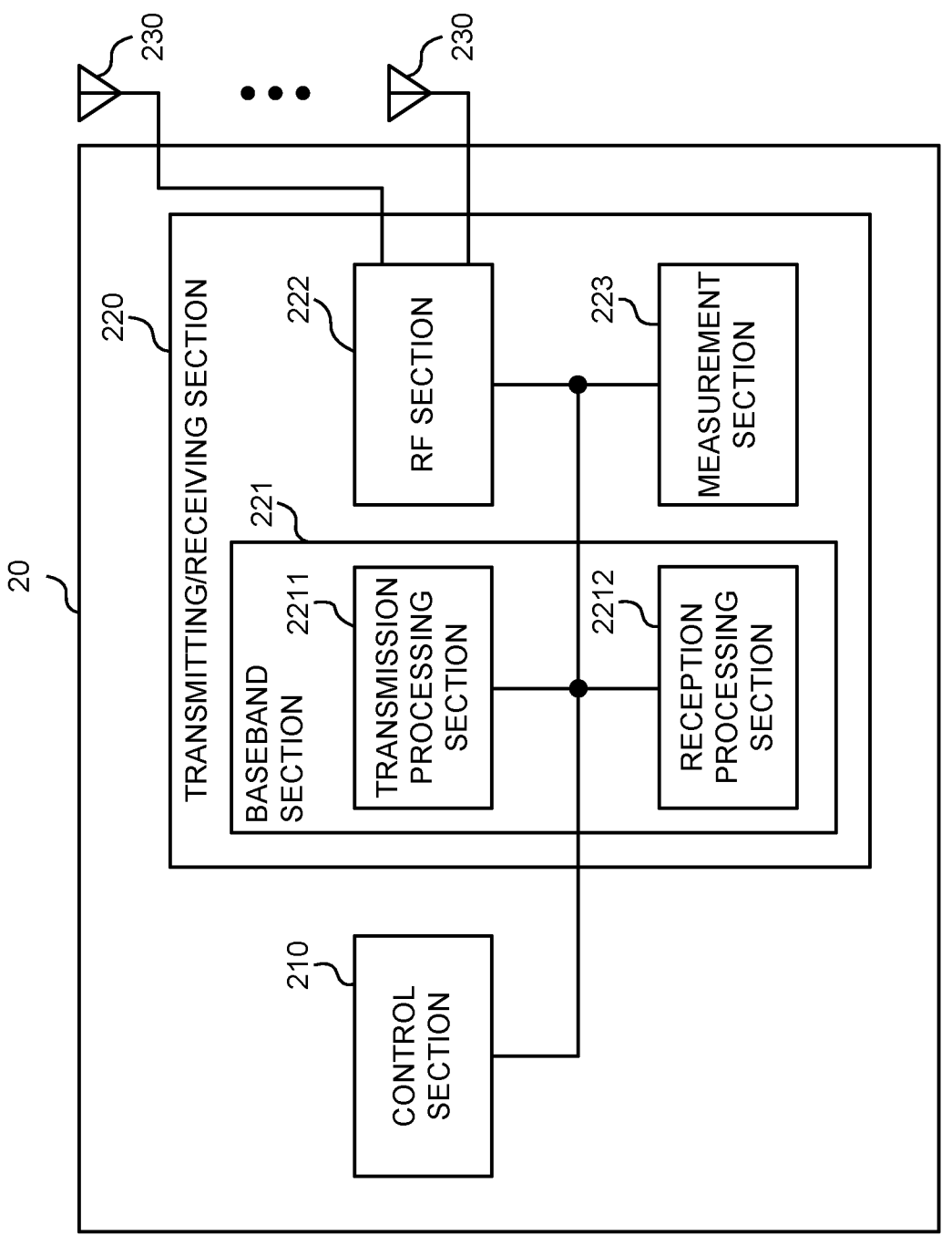
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information related to configuration of transmission of a plurality of physical uplink shared channels (PUSCHs) based on one piece of downlink control information (DCI). The control section 210 may determine, out of a plurality of reference signal indices, one or more reference signal indices used for at least one of spatial relations and pathloss reference signals (PL-RSs) for the plurality of PUSCHs (first and second embodiments).

The control section 210 may judge the number of at least one of the spatial relations and the PL-RSs for the plurality of PUSCHs on the basis of the number of beams applied to the PUSCHs (first embodiment).

When a specific higher layer parameter is configured, the control section 210 may assume that different PL-RSs are applied to respective transmission occasions for the plurality of PUSCHs (second embodiment).

A format of the DCI may be at least one of DCI format 0_1 and DCI format 0_2. The DCI may not include a sounding reference signal resource indicator (SRI) field.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
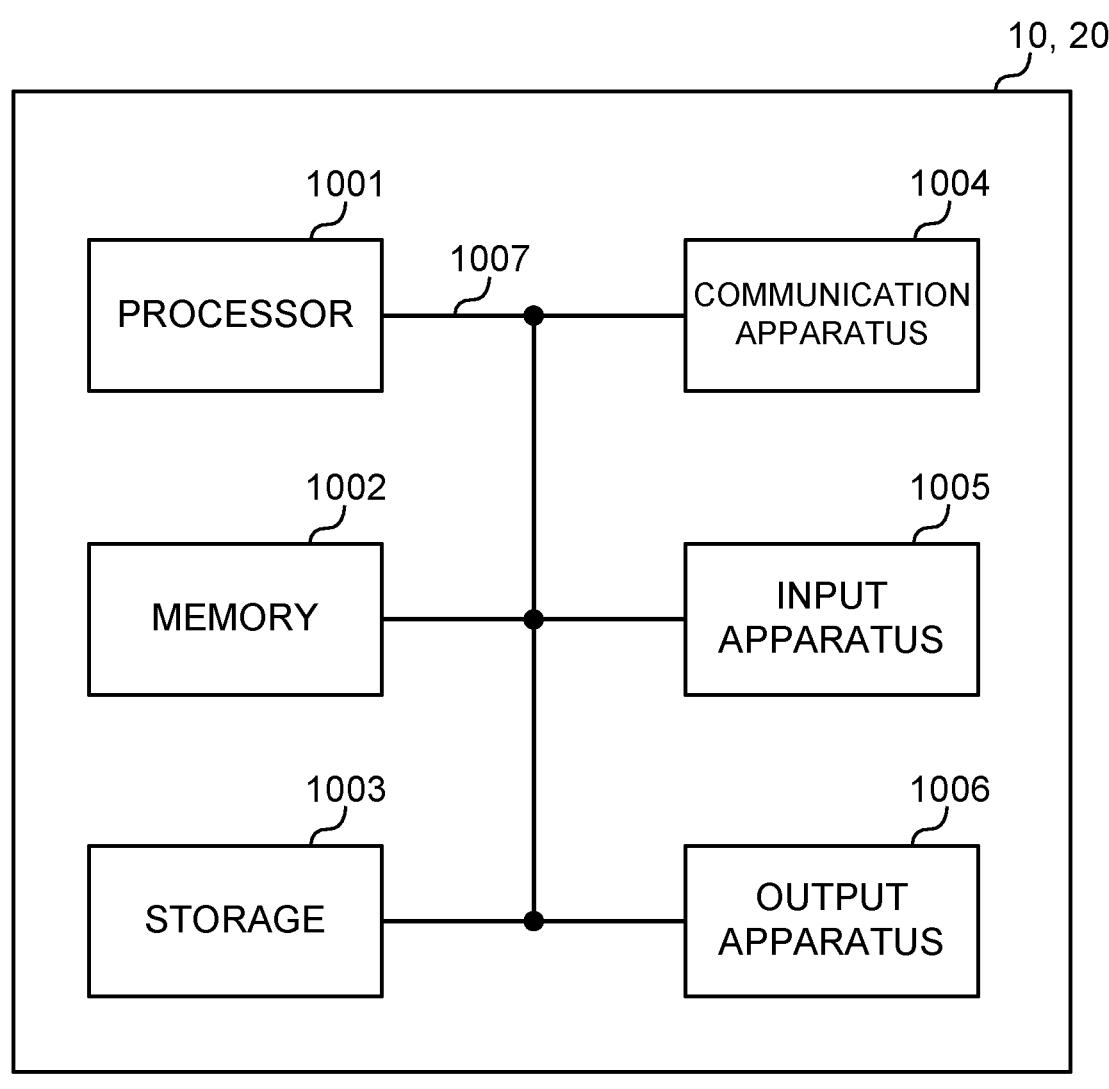
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE may not assume that a certain signal/channel is transmitted/received outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a transmitter that transmits capability information indicating whether to support a default beam for a physical uplink shared channel (PUSCH);

a receiver that receives downlink control information (DCI) for scheduling the PUSCH, the DCI not including a sounding reference signal resource indicator (SRI) field; and
a processor that, in response to the capability information indicating support of the default beam for the PUSCH and a control resource set (CORESET) used for determining a spatial relation of the PUSCH being indicated with a plurality of transmission configuration indicator (TCI) states, determines a first TCI state among the plurality of TCI states as the spatial relation of the PUSCH.

2. The terminal according to claim 1, wherein a format of the DCI is DCI format 0_0.

3. A radio communication method for a terminal, comprising:
transmitting capability information indicating whether to support a default beam for a physical uplink shared channel (PUSCH);
receiving downlink control information (DCI) for scheduling the PUSCH, the DCI not including a sounding reference signal resource indicator (SRI) field; and
in response to the capability information indicating support of the default beam for the PUSCH and a control resource set (CORESET) used for determining a spatial relation of the PUSCH being indicated with a plurality of transmission configuration indicator (TCI) states, determining a first TCI state among the plurality of TCI states as the spatial relation of the PUSCH.

4. A base station comprising:
a receiver that receives capability information, from a terminal, indicating whether to support a default beam for a physical uplink shared channel (PUSCH);
a transmitter that transmits downlink control information (DCI) for scheduling the PUSCH, the DCI not including a sounding reference signal resource indicator (SRI) field; and
a processor, in response to the capability information indicating support of the default beam for the PUSCH and a control resource set (CORESET) used for determining a spatial relation of the PUSCH being indicated with a plurality of transmission configuration indicator (TCI) states, determines a first TCI state among the plurality of TCI states as the spatial relation of the PUSCH.

5. A system comprising: a terminal; and a base station, wherein
the terminal comprises:
a transmitter that transmits capability information indicating whether to support a default beam for a physical uplink shared channel (PUSCH);
a receiver that receives downlink control information (DCI) for scheduling the PUSCH, the DCI not including a sounding reference signal resource indicator (SRI) field; and
a processor that, in response to the capability information indicating support of the default beam for the PUSCH and a control resource set (CORESET) used for determining a spatial relation of the PUSCH being indicated with a plurality of transmission configuration indicator (TCI) states, determines a first TCI state among the plurality of TCI states as the spatial relation of the PUSCH, and
the base station comprises:
a transmitter that transmits the DCI.

* * * * *